US012775019B2

(12) United States Patent
Wang et al.

(10) Patent No.: US 12,775,019 B2
(45) Date of Patent: Oct. 27, 2026

(54) CARTRIDGE PREPROCESSING SYSTEM FOR USE IN AUTOMATED MOLECULAR DIAGNOSTICS INSTRUMENT

(71) Applicant: AUTOBIO LABTEC INSTRUMENTS CO., LTD., Zhengzhou (CN)

(72) Inventors: Chao Wang, Zhengzhou (CN); Peng Zhao, Zhengzhou (CN); Pengtao Wu, Zhengzhou (CN); Yang Pan, Zhengzhou (CN); Yaoji Liu, Zhengzhou (CN); Zhenkun Li, Zhengzhou (CN); Cong Liu, Zhengzhou (CN)

(73) Assignee: AUTOBIO LABTEC INSTRUMENTS CO., LTD., Zhengzhou (CN)

( * ) Notice: Subject to any disclaimer, the term of this patent is extended or adjusted under 35 U.S.C. 154(b) by 669 days.

(21) Appl. No.: 18/269,951

(22) PCT Filed: Dec. 24, 2021

(86) PCT No.: PCT/CN2021/141196

§ 371 (c)(1),
(2) Date: Jun. 27, 2023

(87) PCT Pub. No.: WO2022/143458

PCT Pub. Date: Jul. 7, 2022

(65) Prior Publication Data

US 2024/0069052 A1 Feb. 29, 2024

(30) Foreign Application Priority Data

Dec. 29, 2020 (CN) ........................ 202011601452.7

(51) Int. Cl.

*G01N 35/10* (2006.01)
*B08B 3/04* (2006.01)
*G01N 35/00* (2006.01)

(52) U.S. Cl.

CPC ........... *G01N 35/1004* (2013.01); *B08B 3/04* (2013.01); *G01N 35/00732* (2013.01)

(58) Field of Classification Search

CPC .................... B08B 3/04; B08B 213/00; G01N 2035/00148; G01N 35/00732;

(Continued)

(56) References Cited

U.S. PATENT DOCUMENTS 5,935,523 A 8/1999 McCandless et al.
7,186,378 B2 * 3/2007 Dunfee .............. G01N 35/1079 422/65

(Continued)

FOREIGN PATENT DOCUMENTS

CN 102016540 A 4/2011
CN 103119451 A 5/2013

(Continued)

OTHER PUBLICATIONS

Espacenet English Translation of CN108318312A. (Year: 2018).*

(Continued)

*Primary Examiner* — Kathryn Elizabeth Limbaugh
(74) *Attorney, Agent, or Firm* — Yue (Robert) Xu; Apex Attorneys at Law, LLP

(57) ABSTRACT

A cartridge preprocessing system applied to an automated molecular diagnostics instrument is provided. The cartridge preprocessing system includes a piercing device and a cleaning device. The piercing device includes a drive assembly and a piercing member, and the drive assembly is configured to control the piercing member to alternately move to a piercing station and a cleaning station. The (Continued)

piercing member is configured to pierce a barrier film of a cartridge that moves to the piercing station, and the cleaning device is configured to clean the piercing member that moves to the cleaning station.

12 Claims, 4 Drawing Sheets

(58) Field of Classification Search
CPC ................. G01N 35/026; G01N 35/04; G01N 35/1004; G01N 35/1079; G01N 35/00
See application file for complete search history.

(56) References Cited

U.S. PATENT DOCUMENTS

| | | | |
|---|---|---|---|
| 2005/0074363 | A1 | 4/2005 | Dunfee |
| 2009/0263904 | A1 | 10/2009 | Clinton et al. |
| 2012/0122231 | A1 | 5/2012 | Tajima |
| 2012/0227771 | A1 | 9/2012 | Waterbury et al. |
| 2013/0130369 | A1 | 5/2013 | Wilson et al. |
| 2015/0337400 | A1 | 11/2015 | Wilson et al. |
| 2016/0313361 | A1 | 10/2016 | Onoki et al. |
| 2020/0209268 | A1 | 7/2020 | Tajima |

FOREIGN PATENT DOCUMENTS

| | | | |
|---|---|---|---|
| CN | 104730262 | A | 6/2015 |
| CN | 105733935 | A | 7/2016 |
| CN | 107367622 | A | 11/2017 |
| CN | 108318312 | A | 7/2018 |
| CN | 107367622 | B | 10/2018 |
| CN | 208937594 | U | 6/2019 |
| CN | 111175525 | A | 5/2020 |
| CN | 111596080 | A | 8/2020 |
| CN | 112827906 | A | 5/2021 |
| CN | 214133011 | U | 9/2021 |
| EP | 1409981 | A2 | 4/2004 |
| EP | 2269026 | A2 | 1/2011 |
| JP | 2007127436 | A | 5/2007 |
| JP | 2011021993 | A | 2/2011 |
| WO | 2013/168559 | A1 | 11/2013 |
| WO | 2017/128806 | A1 | 8/2017 |
| WO | 2020/054336 | A1 | 3/2020 |

OTHER PUBLICATIONS

Espacenet English Translation of CN111175525A. (Year: 2020).*
International Search Report for PCT/CN2021/141196 mailed Mar. 22, 2022, ISA/CN.
Search Report dated Apr. 19, 2024 for European patent application No. 21914195.9.
Chinese first Office Action issued on Nov. 11, 2024 for the Chinese priority application No. 202011601452.7.

* cited by examiner

CARTRIDGE PREPROCESSING SYSTEM FOR USE IN AUTOMATED MOLECULAR DIAGNOSTICS INSTRUMENT

The present application is a national phase application of International Application No. PCT/CN2021/141196, filed on Dec. 24, 2021, which claims the benefit of the priority to Chinese Patent Application No. 202011601452.7, titled “CARTRIDGE PREPROCESSING SYSTEM APPLIED TO AUTOMATED MOLECULAR DIAGNOSTICS INSTRUMENT”, filed with the China National Intellectual Property Administration on Dec. 29, 2020, which are incorporated herein by reference in their entireties.

FIELD

The present application relates to the technical field of automated molecular diagnostics instruments, and in particular to a cartridge preprocessing system applied to an automated molecular diagnostics instrument.

BACKGROUND

At present, during the use of automated molecular diagnostic instruments, a barrier film on the top of a cartridge is pierced with a millimeter tip or a film perforator. In order to avoid cross-contamination of reagents in the cartridge, piercing members, each of which is a disposable product and cannot be reused, are used for piercing, which leads to the high equipment cost and more medical waste, thereby polluting the environment.

To sum up, how to provide a cartridge preprocessing system with a reusable piercing member has attracted the attention of those skilled in the art.

SUMMARY

In view of this, an object of the present application is to provide a cartridge preprocessing system applied to an automated molecular diagnostics instrument, which can clean a piercing member, so that the piercing member is reusable, thereby reducing the cost and medical waste.

In order to realize the above object, the following technical solutions are provided according to the present application.

A cartridge preprocessing system applied to an automated molecular diagnostics instrument includes a piercing device and a cleaning device.

The piercing device includes a driving assembly and a piercing member, where the driving assembly is configured to control the piercing member to alternately move to a piercing station and a cleaning station, where the piercing member is configured to pierce a barrier film of a cartridge that moves to the piercing station.

The cleaning device is configured to clean the piercing member that moves to the cleaning station.

In an embodiment, the piercing member includes a cylinder, an upper end of the cylinder is connected with the driving assembly, and a lower end of the cylinder is of a quadrangular pyramid structure.

In an embodiment, the driving assembly includes a lifting driving part and a swinging driving part, where the lifting driving part is connected with the swinging driving part and configured to control the lifting of the swinging driving part, and the swinging driving part is connected with the piercing member and configured to control the piercing member to swing between the piercing station and the cleaning station.

In an embodiment, the lifting driving part includes a lifting motor and a lifting guide rail, the swinging driving part includes a swinging fixing seat, a swinging motor and a swinging arm, where the swinging fixing seat is fixed to an output end of the lifting motor, and the swinging fixing seat is in sliding fit with the lifting guide rail, and where the swinging motor is mounted to the swinging fixing seat, an output shaft of the swinging motor is connected with the swinging arm through a swinging transmission assembly, and the piercing member is fixed to the swinging arm.

In an embodiment, the cartridge preprocessing system further includes a transmission device, the transmission device includes a housing and a pushing part, a transmission passage is arranged inside the housing, the pushing part is configured to push the cartridge to move in the transmission passage, where the driving assembly and the cleaning device each is mounted to the housing, and a piercing port for the piercing member to extend into is arranged at the housing.

In an embodiment, the cartridge preprocessing system further includes an information scanning device for scanning a label at an outer side of the cartridge, where the information scanning device is mounted to the housing, and a code scanning gap for avoiding the information scanning device is arranged at the housing.

In an embodiment, the housing is provided with a filling port for adding reagent to the cartridge.

In an embodiment, the cleaning device includes a cleaning hole for accommodating the piercing member, a cleaning liquid filling port for cleaning liquid to enter the cleaning hole, and a liquid discharge passage for discharging liquid in the cleaning hole.

In an embodiment, the cleaning hole has an upward opening and is cylindrical, an axis of the cleaning liquid filling port is spaced apart from a center of the cleaning hole by a preset distance, where the cleaning liquid forms a vortex in the cleaning hole.

In an embodiment, the number of the cleaning liquid filling port is at least two, and all of the at least two cleaning liquid filling ports are sequentially distributed along a circumferential direction of the cleaning hole.

With the above solutions, the cartridge preprocessing system applied to an automated molecular diagnostics instrument according to the present application has the following advantageous effects.

The cartridge preprocessing system applied to an automated molecular diagnostics instrument according to the present application includes the piercing device and the cleaning device; the piercing device includes the driving assembly and the piercing member, the driving assembly is configured to control the piercing member to alternately move to the piercing station and the cleaning station. The piercing member is configured to pierce the barrier film of the cartridge that moves to the piercing station; and the cleaning device is configured to clean the piercing member that moves to the cleaning station.

The cartridge, when in use, is located at the piercing station, and the driving assembly controls the piercing member to pierce the barrier film of the cartridge at the piercing station. In this process, the reagent adhered to the barrier film of the cartridge may be adhered to the piercing member. If the reagent is not cleaned, when the piercing member repeatedly pierces a barrier film, the reagent of a cartridge adhered to the piercing member is mixed with the reagent of a next cartridge, affecting a test result of the next cartridge; and the piercing member also mixes the reagent in a current cartridge with other reagents in the current cartridge, resulting in an abnormal test result of the current cartridge.

In the cartridge preprocessing system applied to an automated molecular diagnostics instrument according to the present application, after the piercing is completed, the driving assembly controls the piercing member to move to the cleaning station. The piercing member is washed by the cleaning device to remove the reagent adhered to the piercing member. When a next barrier film needs to be pierced, the driving assembly drives the piercing member back to the piercing station again.

In the cartridge preprocessing system applied to an automated molecular diagnostics instrument according to the present application, the piercing member is cleaned by the cleaning device, so that the piercing member can be reused, which reduces the use of consumables, reduces the cost of users and is more environmentally friendly.

BRIEF DESCRIPTION OF THE DRAWINGS

To describe the technical solutions in the embodiments of the present application or in the conventional technology more clearly, the accompanying drawings used in description of the embodiments or the conventional technology are briefly introduced hereinafter. Apparently, the accompanying drawings in the following description show merely the embodiments of the present application, and for those skilled in the art, other drawings can be obtained based on the provided accompanying drawings without creative efforts.

Figure 1:
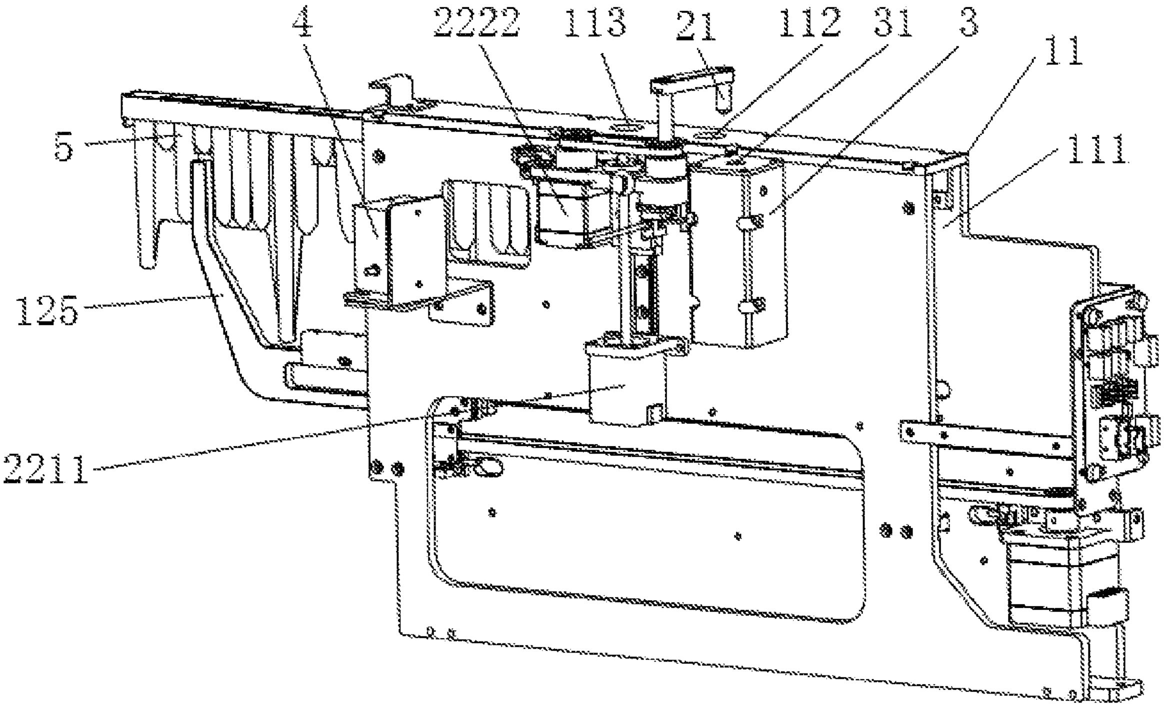
FIG. 1 is a schematic structural diagram of a cartridge preprocessing system applied to an automated molecular diagnostics instrument according to an embodiment of the present application.

The reference numerals in the drawings are listed as follows.

transmission device 1, housing 11, passage 111, piercing port 112, filling port 113, guiding member 114, pushing part 12, pushing motor 121, synchronous belt 122, pushing guide rail 123, sliding block 124, pusher 125, origin sensor 126; piercing device 2, piercing member 21, driving assembly 22, lifting driving part 221, lifting motor 2211, lifting guide rail 2212, swinging driving part 222, swinging fixing seat 2221, swinging motor 2222 swinging transmission assembly 2223, swinging arm 2224; cleaning device 3, cleaning hole 31, cleaning fluid filling port 32, liquid discharge passage 33; information scanning device 4; cartridge 5.

DETAILED DESCRIPTION OF THE EMBODIMENTS

Technical solutions in the embodiments of the present application are clearly and completely described below in conjunction with the drawings of the embodiments of the present application. Apparently, the embodiments described hereinafter are only some embodiments of the present application, rather than all of the embodiments. All the other embodiments obtained by those skilled in the art based on the embodiments in the present application without any creative efforts fall into the scope of protection of the present application.

Generally, a cartridge 5 includes a reaction bin and multiple reagent holes. In order to better store reagents and prevent cross contamination of reagents in the cartridge 5, a barrier film is provided at the top of each reagent hole to seal the reagents in the reagent holes respectively. When in use, the reagents in the reagent holes are put into the reaction bin. In order to access the reagents in the reagent holes in the cartridge 5, the barrier film at the top of the cartridge 5 is required to be pierced first.

Referring to FIG. 1, a cartridge preprocessing system applied to an automated molecular diagnostics instrument according to the present application includes a piercing device 2 and a cleaning device 3.

Specifically, the piercing device 2 includes a driving assembly 22 and a piercing member 21. The driving assembly 22 may be a mechanical arm or other driving structures. The driving assembly 22 is connected with the piercing member 21 and controls the movement of the piercing member 21, so that the piercing member 21 alternately moves to a piercing station and a cleaning station in a preset path. The piercing member 21 has a relatively sharp tip.

In the operation of the cartridge preprocessing system with the above structure, when the piercing member 21 is moved to the piercing station under the control of the driving assembly 22, the piercing member 21 pierces the barrier film of the cartridge 5 by its own structure. When the piercing member 21 moves to the cleaning station, the cleaning device 3 cleans the piercing member 21 with cleaning liquid. The cartridge preprocessing system performs a relevant preprocessing function on the cartridge 5 before a test through cooperation of the piercing device 2 and the cleaning device 3. In the cartridge preprocessing system, the barrier film is pierced through the piercing member 21, which solves the problem of piercing the barrier film on the top of the cartridge 5 before using the reagent in the cartridge 5. In addition, in the cartridge preprocessing system, the piercing member 21 is cleaned by using the cleaning device 3, so that the piercing member 21 can be reused, thereby reducing the use of consumables and reducing the cost of users. In addition, the cartridge preprocessing system has the advantages of simple structure, high safety and reliability, low risk of system pollution, and convenient maintenance.

Figure 4:
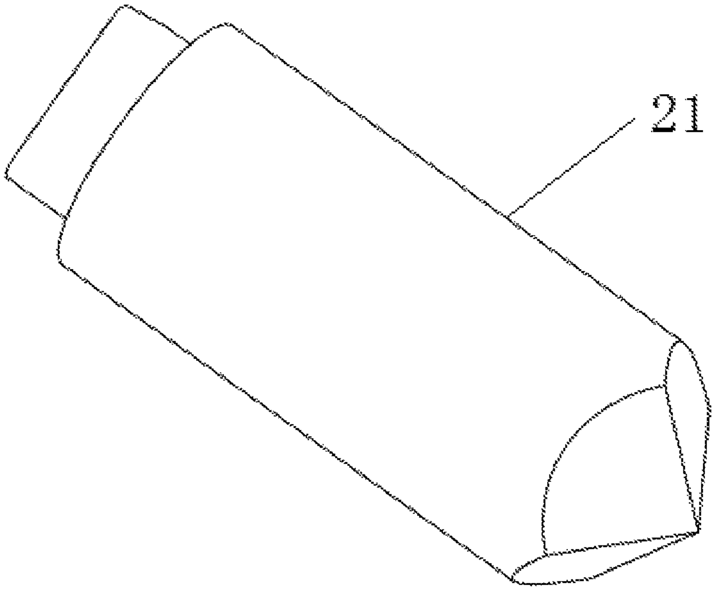
FIG. 4 is a schematic structural diagram of a piercing member according to the embodiment of the present application.

Further, in an embodiment, referring to FIG. 4, the piercing member 21 includes a cylinder, where an upper end of the cylinder is connected with the driving assembly 22, for example, the upper end of the cylinder is connected with a swinging arm 2224 in the driving assembly 22. A lower end of the cylinder is of a quadrangular pyramid structure. In an embodiment, the reagent hole of the cartridge 5 is generally cylindrical, and the top of the reagent hole is square-shaped. Correspondingly, a body of the piercing member 21 is of a cylindrical structure, and a diameter of the cylinder is adapted to a cross section of the reagent hole of the cartridge 5. A lower end of the piercing member 21 is of a quadrangular oblique cutting structure, that is, a quadrangular pyramid with sharp corners. The lower end of the piercing member 21 corresponds to a square opening of the reagent hole of the cartridge 5, so as to ensure that a tip of the piercing member 21 can be fitted with four side walls of the reagent hole after the barrier film is pierced, thereby not affecting a subsequent reagent taking operation. The piercing member 21 should have a certain hardness and may be made of metal.

Figure 3:
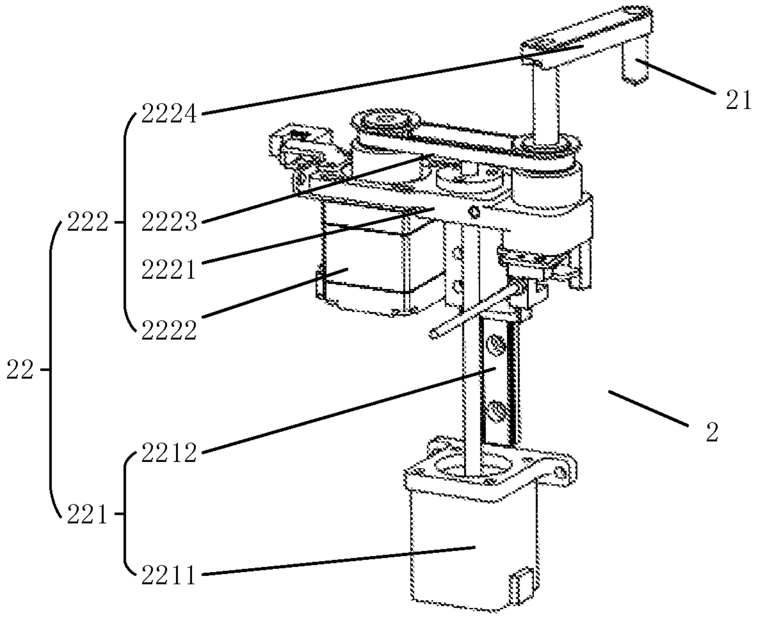
FIG. 3 is a schematic structural diagram of a piercing device according to the embodiment of the present application.

Further, in an embodiment, referring to FIG. 3, the driving assembly 22 includes a lifting driving part 221 and a swinging driving part 222. The lifting driving part 221 is connected with the swinging driving part 222 and controls the lifting of the swinging driving part 222. The swinging driving part 222 is connected with the piercing member 21 and controls the piercing member 21 to swing between the piercing station and the cleaning station. Specifically, by means of swinging, the piercing member 21 can be kept away from a preset transmission direction of the cartridge 5 after a piecing operation is completed, facilitating spatially arranging the cleaning device 3.

Further, in an embodiment, the lifting driving part 221 includes a lifting motor 2211 and a lifting guide rail 2212, the swinging driving part 222 includes a swinging fixing seat 2221, a swinging motor 2222, a swinging transmission assembly 2223 and a swinging arm 2224. The lifting motor 2211 may be a screw motor, the swinging fixing seat 2221 is fixed to an output end of the lifting motor 2211, and the swinging fixing seat 2221 is in sliding fit with the lifting guide rail 2212. A casing of the swinging motor 2222 is fixedly connected with the swinging fixing seat 2221, and an output shaft of the swinging motor 2222 is connected with the swinging arm 2224 through the swinging transmission assembly 2223. The swinging transmission assembly 2223 may be a coupling, a transmission belt or other transmission structures. The piercing member 21 is fixed to the swinging arm 2224. During operation, the lifting motor 2211 controls the swinging driving part 222 and the piercing member 21 to move upward or downward as a whole, and a starting position and an ending position of the movement may be detected by sensors respectively and controlled by electric control.

In an embodiment, the cartridge preprocessing system applied to an automated molecular diagnostics instrument further includes a transmission device 1. The transmission device 1 is configured to control the movement of the cartridge 5, for example, the transmission device 1 may control the cartridge 5 to move to the piercing station, control the cartridge 5 to move from the piercing station to the cleaning station, or control the cartridge 5 to move from the cleaning station to a subsequent processing station.

In an embodiment, the transmission device 1 includes a housing 11 and a pushing part 12, a transmission passage 111 is arranged inside the housing 11, the pushing part 12 is configured to push the cartridge 5 to move in the transmission passage 111. The driving assembly 22 and the cleaning device 3 each is mounted to the housing 11, a piercing port 112 for the piercing member 21 to extend into is arranged at the housing 11. Specifically, the cartridge 5 is encapsulated in the passage 111 inside the housing 11. The housing 11 may be provided with a guiding member 114 to provide a guiding function for the movement of the cartridge 5. The housing 11 is provided with a piercing port 112 for the piercing member 21 to pass through, thereby piercing the barrier film.

Figure 2:
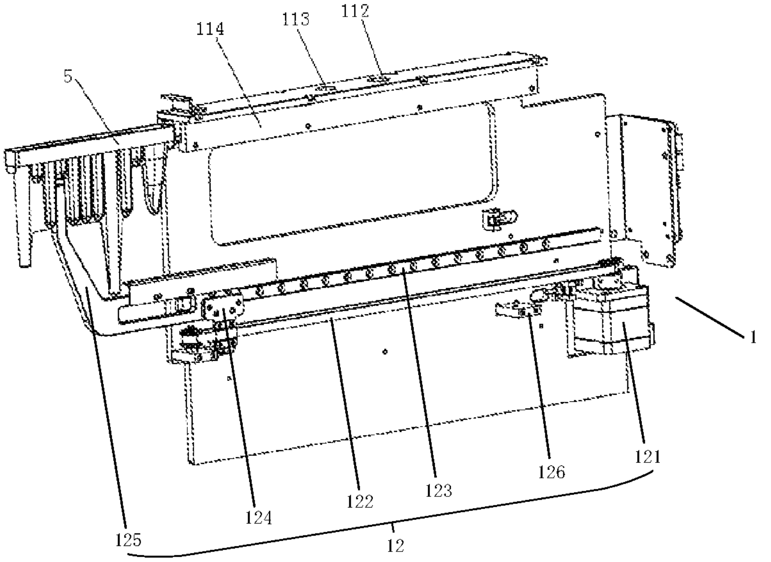
FIG. 2 is a schematic partial structural diagram of a transmission device according to an embodiment of the present application.

In an embodiment, referring to FIG. 2, the pushing part 12 includes a pushing motor 121, a driven wheel, a synchronous belt 122, a pushing guide rail 123, a sliding block 124 and a pusher 125. The pushing motor 121 may be a stepping motor, a driving shaft and a driven wheel of the pushing motor 121 are connected through the synchronous belt 122, the pushing guide rail 123 is fixed to the housing 11, the sliding block 124 is in sliding fit with the pushing guide rail 123, the sliding block 124 is fixedly connected with the synchronous belt 122 and the pusher 125, and the pusher 125 may be embedded in the middle of the cartridge 5 and push the cartridge 5 to move. During operation, the pushing motor 121 rotates, and the pusher 125 is driven to move by the synchronous belt 122. The pusher 125 pushes the cartridge 5 to move in a preset direction in the passage 111, thereby controlling the cartridge 5 to move to various functional positions, for example, an information reading position, a reagent filling position and a piercing position of the cartridge 5, to realize relevant functions. Then, after information reading, reagent filling and barrier film piercing are performed on the cartridge 5 in the passage 111, the cartridge 5 is driven to move reversely in the passage 111 and exit from the passage 111 through the reverse rotation of the pushing motor 121, so as to carry out follow-up operations of a test. The movement of the pusher 125 is controlled by the pushing motor 121, and a starting position and an ending position of the movement may be detected by an origin sensor 126 and a limit sensor respectively, and controlled by electric control.

It is understandable that the transmission device 1 may also control the movement of the cartridge 5 by other means in the conventional technology. For example, the transmission device 1 may be a manipulator.

Further, in an embodiment, the cartridge preprocessing system applied to an automated molecular diagnostics instrument further includes an information scanning device 4. The information scanning device 4 is used to scan a label at an outer side of the cartridge 5. Specifically, the label is generally provided at the outer side of the cartridge 5, the label stores information including the type, manufacturing information, serial number, expiration date, instruction manual, or the like of the cartridge 5, and the information are stored in machine-readable ways such as barcode, QR code, and RFID identifier. The information scanning device 4 is a code reader; the code reader may be a device capable of reading barcode or QR code, or a device capable of reading RFID identifier. Before sample processing, when the cartridge 5 is loaded in the system, the information scanning device 4 reads the information on the label of the cartridge 5 in advance, so that the information can be transferred in the system, solving the problem of reading the information on the cartridge 5 into the system and transferring the information in the system. In the actual arrangement, the information scanning device 4 may be mounted to the housing 11; accordingly, a code scanning gap for avoiding the information scanning device 4 is arranged at the housing 11.

Further, in an embodiment, the housing 11 is provided with a filling port 113, and reagent may be added to the cartridge 5 through the filling port 113.

Figure 5:
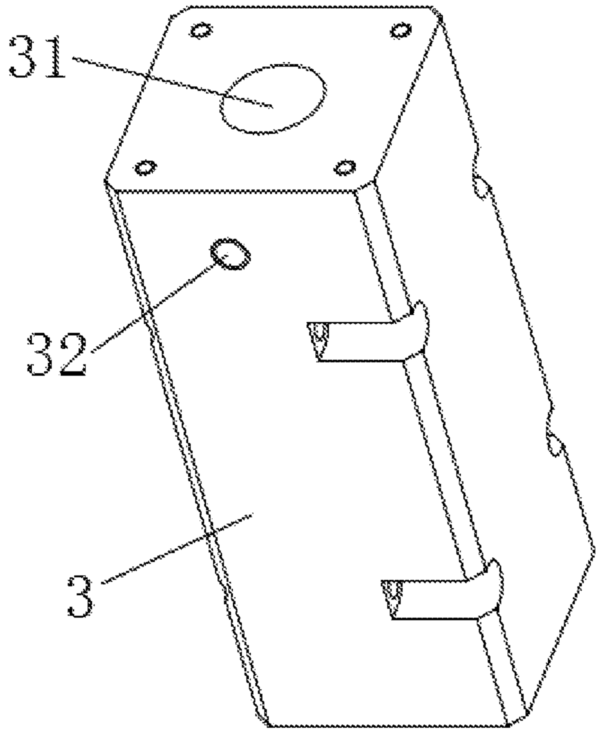
FIG. 5 is a schematic structural diagram of a cleaning device according to the embodiment of the present application.
Figure 6:
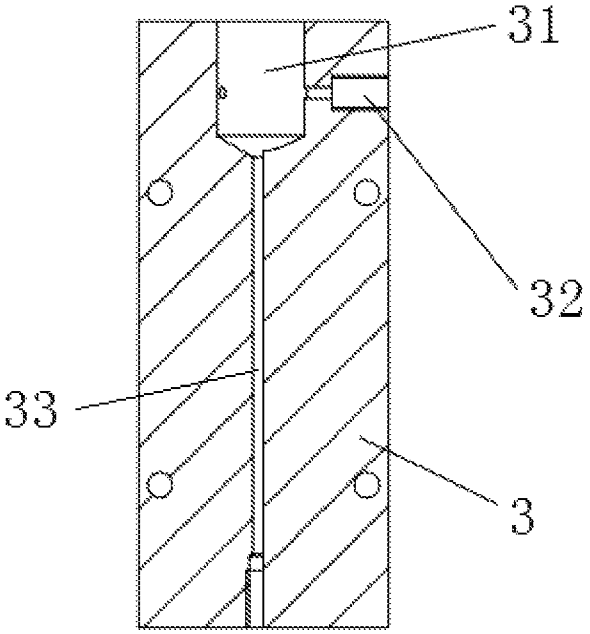
FIG. 6 is a front sectional view of the cleaning device shown in FIG. 5.

Further, in an embodiment, referring to FIG. 5 and FIG. 6, the cleaning device 3 includes a cleaning hole 31, a cleaning liquid filling port 32, and a liquid discharge passage 33. The cleaning hole 31 is configured to accommodate the piercing member 21, the cleaning liquid filling port 32 and the liquid discharge passage 33 are communicated with the cleaning hole 31, the cleaning liquid filling port 32 allows the cleaning liquid to enter the cleaning hole 31, and the liquid discharge passage 33 is configured to discharge the liquid in the cleaning hole 31. When in use, the cleaning liquid filling port 32 needs to be connected with a cleaning container through a pipeline, and the cleaning device is further equipped with a power source for driving the cleaning liquid to flow. The power source may be a diaphragm pump or a peristaltic pump, and the piercing member 21 may be continuously washed by flowing cleaning liquid to achieve the cleaning effect.

Figure 7:
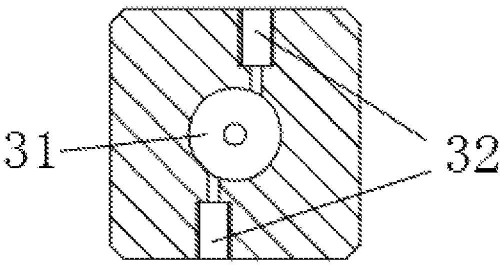
FIG. 7 is a top sectional view of the cleaning device shown in FIG. 5.

Further, in an embodiment, referring to FIG. 6 and FIG. 7, the cleaning hole 31 has an upward opening and is cylindrical; the cleaning liquid filling port 32 is communicated with the cleaning hole 31 from a side portion of the cleaning hole 31. When viewed from a projection of the cleaning hole 31 in an axial direction, an axis of the cleaning liquid filling port 32 is spaced apart from a center of the cleaning hole 31 by a preset distance. Specifically, the cleaning liquid filling port 32 extends along a direction of a secant of the cleaning hole 31, and the secant is not the diameter of the cleaning hole. That is, the cleaning liquid filling port 32 is offset from the center of the cleaning hole 31, rather than facing towards the center of the cleaning hole 31. With the above structure, after the cleaning liquid is filled into the cleaning hole 31, a vortex may be formed in the cleaning hole 31, which facilitates cleaning the piercing member 21 more cleaner.

Further, in an embodiment, the number of the cleaning liquid filling port 32 is at least two, and all of the at least two cleaning liquid filling ports 32 are sequentially distributed along a circumferential direction of the cleaning hole 31. Multiple cleaning liquid filling ports 32 may further promote the cleaning liquid to form a vortex, so as to optimize the cleaning effect. It is preferable that the number of the cleaning liquid filling ports 32 is two.

The working flow of the cartridge preprocessing system applied to an automated molecular diagnostics instrument with the above structure is as follows.

The pusher 125 pushes the cartridge 5 into the passage 111 until the label stuck on a side face of the cartridge 5 is directly facing towards the information scanning device 4, the information scanning device 4 reads the information on the label of the cartridge 5.

After the information on the cartridge 5 is read, the transmission device 1 pushes the cartridge 5 to move forward until the reaction bin on the cartridge 5 is directly facing towards the filling hole, the reagent stored in a reagent storage area of the instrument is filled by the reagent filling device at this position.

After reading the information on the cartridge 5, the pusher 125 pushes the cartridge 5 forward along the passage 111 in the housing 11, until the reagent hole covered by the barrier film is aligned with the piercing port 112 below the piercing member 21, the lifting motor 2211 drives the piercing member 21 to move downwards, and the barrier film on the cartridge 5 is pierced by a tip of the piercing member 21. There is a certain space between a liquid level in the reagent hole of the cartridge 5 and the barrier film at the top of the cartridge 5. After the piercing member 21 pierces the barrier film at the top of the cartridge 5, a lower end of the piercing member 21 is not in contact with the reagent in the reagent hole of the cartridge 5.

Since the reagent adhered to the barrier film may be adhered to the tip of the piercing member 21 after the barrier film of the reagent hole of the cartridge 5 is pierced, if the piercing member 21 is not cleaned, the reagent adhered to the piercing member 21 is mixed with the reagent of a next cartridge 5 when the piercing member 21 pierces again, affecting a test result of the next cartridge 5; or the reagents in the reagent holes of a current cartridge 5 are mixed, resulting in an abnormal test result of the current cartridge 5. Therefore, after the barrier film on the top of the cartridge 5 is pierced, the tip of the piercing member 21 needs to be cleaned.

After the barrier film of the cartridge 5 is pierced, the lifting motor 2211 drives the piercing member 21 to move upward. When the tip of the piercing member 21 fully moves above the passage 111, the piercing member 21 is driven to swing above the cleaning hole 31 by the swinging driving part 222, the lifting motor 2211 drives the piercing member 21 to move downward until the piercing member 21 enters into the cleaning hole 31 of the cleaning device 3. The power source operates to pump out the cleaning liquid in a cleaning container, and the tip of the piercing member 21 is cleaned through the cleaning liquid filling port 32 of the cleaning device 3. After the tip is cleaned, the lifting motor 2211 rotates again to lift up the piercing member 21 until the tip of the piercing member 21 is higher than the top of the passage 111, the swinging driving part 222 operates again and drives the piercing member 21 to a position above the piercing port 112. Then, the transmission device 1 pushes the cartridge 5 forward again until a next reagent hole on the cartridge 5 is aligned with the piercing port 112, the piercing device 2 and the cleaning device 3 may enter a next cycle until all of barrier films on the top of the cartridge 5 are pierced.

When all of barrier films on the top of the cartridge 5 are pierced, the pushing motor 121 in the pushing part 12 of the transmission device 1 rotates reversely and pushes the cartridge 5 out of the passage 111. The cartridge 5 is pushed to a next operation position under the action of the transmission device 1 for subsequent operation.

The above embodiments in the specification are described in a progressive manner. Each of the embodiments is mainly focused on describing the differences from other embodiments, and reference may be made among these embodiments with respect to the same or similar parts.

The cartridge preprocessing system applied to an automated molecular diagnostics instrument according to the present application is described in detail above. The principle and embodiments of the present application are described through specific examples herein. The description of the above embodiments is merely used to facilitate understanding the method and core idea of the present application. It should be noted that several improvements and modifications can be made to the present application by those skilled in the art without departing from the principles of the present application. These improvements and modifications shall fall within the scope of protection of the present application defined by the claims.

The invention claimed is:

1. A cartridge preprocessing system applied to an automated molecular diagnostics instrument, comprising:

a piercing device comprising a driving assembly and a piercing member, wherein the driving assembly is configured to control the piercing member to alternately move to a piercing station and a cleaning station, wherein the piercing member is configured to pierce a barrier film of a cartridge that moves to the piercing station;

a cleaning device, configured to clean the piercing member that moves to the cleaning station; and a transmission device comprising a housing and a pushing part, wherein a transmission passage is arranged inside the housing, the pushing part is configured to push the cartridge to move in the transmission passage, the driving assembly and the cleaning device each is mounted to the housing, a piercing port for the piercing member to extend into is arranged in and extends through the housing, and the housing is provided with a filling port configured to add reagent to the cartridge and extending through the housing.

2. The cartridge preprocessing system applied to an automated molecular diagnostics instrument according to claim 1, wherein the piercing member comprises a cylinder, an upper end of the cylinder is connected with the driving assembly, and a lower end of the cylinder is of a quadrangular pyramid structure.

3. The cartridge preprocessing system applied to an automated molecular diagnostics instrument according to claim 1, wherein the driving assembly comprises a lifting driving part and a swinging driving part, wherein the lifting driving part is connected with the swinging driving part and is configured to control the lifting of the swinging driving part, and the swinging driving part is connected with the piercing member and configured to control the piercing member to swing between the piercing station and the cleaning station.

4. The cartridge preprocessing system applied to an automated molecular diagnostics instrument according to claim 3, wherein the lifting driving part comprises a lifting motor and a lifting guide rail, the swinging driving part comprises a swinging fixing seat, a swinging motor and a swinging arm, the swinging fixing seat is fixed to an output end of the lifting motor, and the swinging fixing seat is in sliding fit with the lifting guide rail, and the swinging motor is mounted to the swinging fixing seat, an output shaft of the swinging motor is connected with the swinging arm through a swinging transmission assembly, and the piercing member is fixed to the swinging arm.

5. The cartridge preprocessing system applied to an automated molecular diagnostics instrument according to claim 1, further comprising an information scanning device for scanning a label at an outer side of the cartridge, wherein the information scanning device is mounted to the housing, and a code scanning gap for avoiding the information scanning device is arranged at the housing.

6. The cartridge preprocessing system applied to an automated molecular diagnostics instrument according to claim 1, wherein the cleaning device comprises a cleaning hole for accommodating the piercing member, a cleaning liquid filling port for cleaning liquid to enter the cleaning hole, and a liquid discharge passage for discharging liquid in the cleaning hole.

7. The cartridge preprocessing system applied to an automated molecular diagnostics instrument according to claim 6, wherein the cleaning hole has an upward opening and is cylindrical, an axis of the cleaning liquid filling port is spaced apart from a center of the cleaning hole by a preset distance, wherein the cleaning liquid forms a vortex in the cleaning hole.

8. The cartridge preprocessing system applied to an automated molecular diagnostics instrument according to claim 7, wherein the number of the cleaning liquid filling port is at least two, and all of the at least two cleaning liquid filling ports are sequentially distributed along a circumferential direction of the cleaning hole.

9. The cartridge preprocessing system applied to an automated molecular diagnostics instrument according to claim 2, wherein the cleaning device comprises a cleaning hole for accommodating the piercing member, a cleaning liquid filling port for cleaning liquid to enter the cleaning hole, and a liquid discharge passage for discharging liquid in the cleaning hole.

10. The cartridge preprocessing system applied to an automated molecular diagnostics instrument according to claim 3, wherein the cleaning device comprises a cleaning hole for accommodating the piercing member, a cleaning liquid filling port for cleaning liquid to enter the cleaning hole, and a liquid discharge passage for discharging liquid in the cleaning hole.

11. The cartridge preprocessing system applied to an automated molecular diagnostics instrument according to claim 4, wherein the cleaning device comprises a cleaning hole for accommodating the piercing member, a cleaning liquid filling port for cleaning liquid to enter the cleaning hole, and a liquid discharge passage for discharging liquid in the cleaning hole.

12. The cartridge preprocessing system applied to an automated molecular diagnostics instrument according to claim 5, wherein the cleaning device comprises a cleaning hole for accommodating the piercing member, a cleaning liquid filling port for cleaning liquid to enter the cleaning hole, and a liquid discharge passage for discharging liquid in the cleaning hole.

* * * * *